(12) United States Patent
Sarnowski et al.

(10) Patent No.: US 9,625,087 B2
(45) Date of Patent: Apr. 18, 2017

(54) OUTRIGGER MOUNT

(71) Applicant: GEM Products, Inc., Orange Park, FL (US)

(72) Inventors: Jason Sarnowski, Jacksonville, FL (US); Matthew Stewart Onorato, Jacksonville, FL (US); Erle Matthew Bridgewater, Ponte Vedra, FL (US); Benjamin Adam Wilder, Jacksonville, FL (US)

(73) Assignee: GEM Products, Inc., Orange Park, FL (US)

( * ) Notice: Subject to any disclaimer, the term of this patent is extended or adjusted under 35 U.S.C. 154(b) by 0 days.

(21) Appl. No.: 14/853,019

(22) Filed: Sep. 14, 2015

(65) Prior Publication Data

US 2017/0074454 A1 Mar. 16, 2017

(51) Int. Cl.
*A01K 97/10* (2006.01)
*F16M 13/02* (2006.01)
*B63B 17/00* (2006.01)

(52) U.S. Cl.
CPC .............. *F16M 13/02* (2013.01); *B63B 17/00* (2013.01)

(58) Field of Classification Search
CPC ........ F16M 13/02; B63B 17/00; B63B 35/14; B63B 35/16; B63B 35/18; B63B 35/20; A01K 97/10

USPC ............................................ 248/534; 43/21.2
See application file for complete search history.

(56) References Cited

U.S. PATENT DOCUMENTS

| | | | | |
|---|---|---|---|---|
| 6,766,757 B1* | 7/2004 | Tilley | ..................... | A01K 91/08 114/255 |
| 7,669,361 B2* | 3/2010 | Baez | ...................... | A01K 91/08 114/255 |
| 8,186,095 B2* | 5/2012 | Wilcox | .................. | A01K 91/08 114/255 |
| 2004/0035350 A1* | 2/2004 | Rupp, II | ................. | B63B 35/14 114/364 |
| 2004/0206288 A1* | 10/2004 | Wilcox | ................... | B63B 35/14 114/255 |
| 2011/0083357 A1* | 4/2011 | Blondek | ................ | A01K 91/08 43/27.4 |
| 2013/0333271 A1* | 12/2013 | Rupp | ..................... | A01K 91/08 43/27.4 |
| 2015/0366180 A1* | 12/2015 | Chmura | ................. | A01K 97/10 248/514 |

\* cited by examiner

*Primary Examiner* — Christopher E Garft
(74) *Attorney, Agent, or Firm* — Seyfarth Shaw LLP

(57) ABSTRACT

A mount capable of rotating a body in multiple planes with a single handle. The handle can be disposed in a first position, where rotation of the handle causes the body to rotate in a horizontal plane; or a second position, where rotation of the handle causes the body to rotate in a vertical plane. The body can otherwise be locked and not rotatable.

21 Claims, 7 Drawing Sheets

OUTRIGGER MOUNT

TECHNICAL FIELD OF THE INVENTION

The present application relates generally to mounts. More particularly, the present application relates to outrigger mounts capable of being rotated in multiple rotational directions with a single handle.

BACKGROUND OF THE INVENTION

Outriggers are popular in fishing applications. Outriggers are rigid poles that are a part of the boats rigging and are designed to extend the fishing pole bait lines beyond the "white wash" of the water surrounding the boat. This is preferable because bait traveling through clear water is more likely to successfully attract a fish. Once a fish takes the bait the line is automatically released from the outrigger and all forces are transferred directly to a fishing pole secured to the gunnel of the boat.

Outriggers are typically maintained in mounts that are rotatable in multiple rotational directions. For example, the mount can be rotated in a horizontal plane, so the mount holding the outrigger can be aimed in a desired direction. The mount can also rotate the outrigger in a vertical plane, perpendicular to the horizontal plane, so the outrigger can be angled in a different inclination.

Conventional mounts allow rotation of the outrigger in the horizontal plane with a handle, but require manual manipulation to rotate the outrigger in a vertical plane. For example, a user must use their hands or a tool to cause the outrigger to rotate in the vertical plane. Some mounts include a second handle for vertical rotation, while some require the user to grip the outrigger or mount itself for vertical rotation.

SUMMARY OF THE INVENTION

The present invention broadly comprises a mount capable of rotating an outrigger in multiple rotational direction, for example, both the horizontal and vertical planes, using a single handle. The handle can, when in a first position, cause a tube holding the outrigger to rotate in a horizontal plane upon rotation of the handle, and when in a second position, cause the tube to rotate in a vertical plane upon rotation of the handle. The outrigger is otherwise locked and cannot rotate other than the rotation permitted by the handle in the first or second positions.

In an embodiment, the present invention broadly comprises a mount having a tube rotatable about a pivot pin, a handle having a joint with first and second sides, and a pin opening defined within the joint proximate the first side and distal to the second side, the handle is coupled to the tube and adapted to cause the tube to rotate in a first rotational direction and a second rotational direction perpendicular to the first rotational direction depending on a position of the handle, a first mechanism coupled to the tube and adapted to cause the tube to rotate in the first rotational direction when the handle is disposed in a first position, and a second mechanism coupled to the tube and adapted to cause the tube to rotate in the second rotational direction when the handle is disposed in a second position.

In another embodiment, the present invention broadly includes a mount having a tube rotatable about a pivot pin, a handle having a joint with first and second sides, and a pin opening defined within the joint proximate the first side and distal to the second side, the handle is coupled to the tube and adapted to cause the tube to rotate in a first rotational direction and a second rotational direction perpendicular to the first rotational direction depending on a position of the handle, a base rotatable about a pivot pin and coupled to the tube, a base pin movably disposed within a slot of the base, a base connector coupled to the base pin and having internal threads, and a shaft having external threads and being threadably coupled to the base connector, and further coupled to the handle, wherein rotation of the handle causes the shaft to rotate and axially displace the base connector and thereby move the base pin within the slot.

In yet another embodiment, the present invention broadly comprises a mount including a tube rotatable about a pivot pin, a handle having a joint with first and second sides, and a pin opening defined within the joint proximate the first side and distal to the second side, the handle being coupled to the tube and adapted to cause the tube to rotate in a first rotational direction and a second rotational direction perpendicular to the first rotational direction depending on a position of the handle, a housing gear coupled to the tube, a shaft coupled to the handle and adapted to rotate upon rotation of the handle, a selector gear engageable with the housing gear and coupleable to the handle when the first rotational direction is selected, a cap disposed proximate the first side when the first rotational direction is selected, and a bias member biasing the selector gear into a coupling engagement with the handle.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
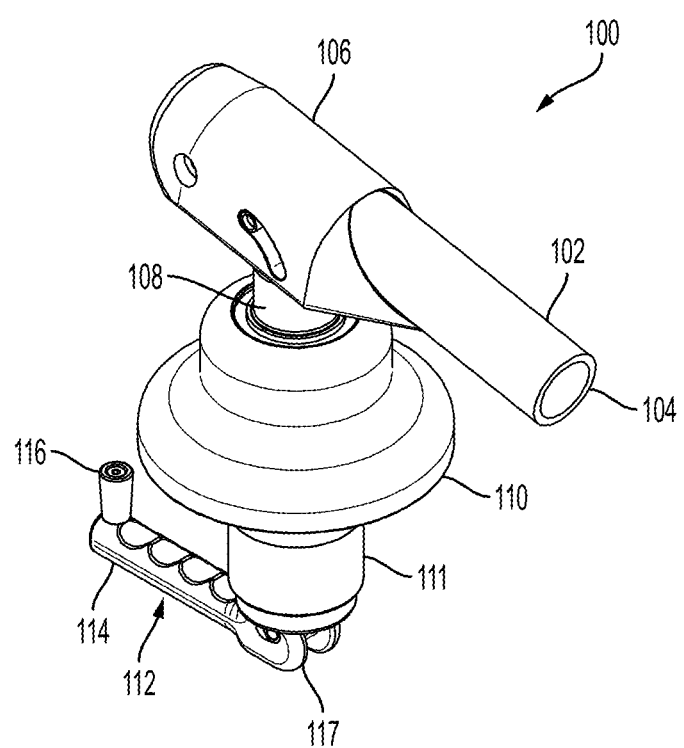
FIG. 1 is a top perspective view of a mount according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises an outrigger mount with a handle that rotates a tube in both the horizontal and vertical planes. The knob of the handle can be disposed in one of two positions. In a first position, with the knob facing upwardly, rotation of the handle can cause the tube to rotate in a horizontal plane. In a second position, with the knob facing downwardly, rotation of the handle can cause the tube to rotate in a vertical plane, i.e., a rotational direction perpendicular to the rotational direction in which the tube rotated in the first position. The tube can otherwise be locked and not rotatable, for example, vertically locked when the tube is in the first position.

Figure 3B:
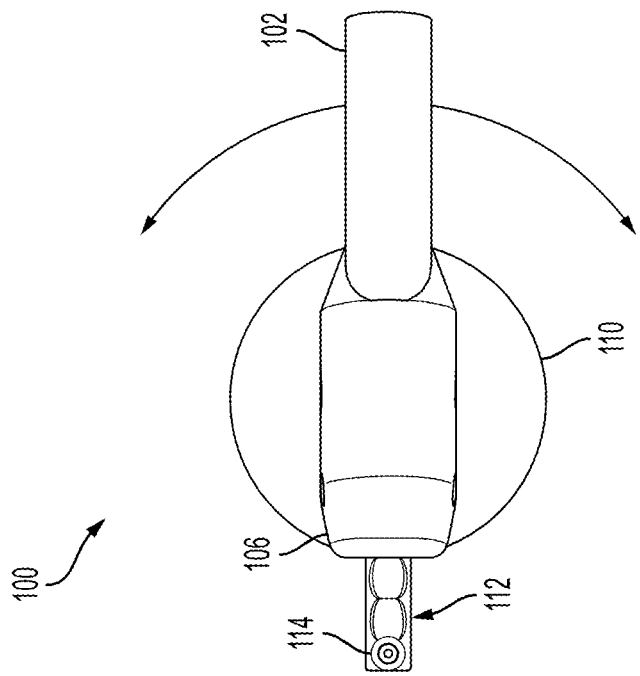
FIG. 3B is a top plan view of the mount of FIG. 3A in the first position according to an embodiment of the present invention.
Figure 3A:
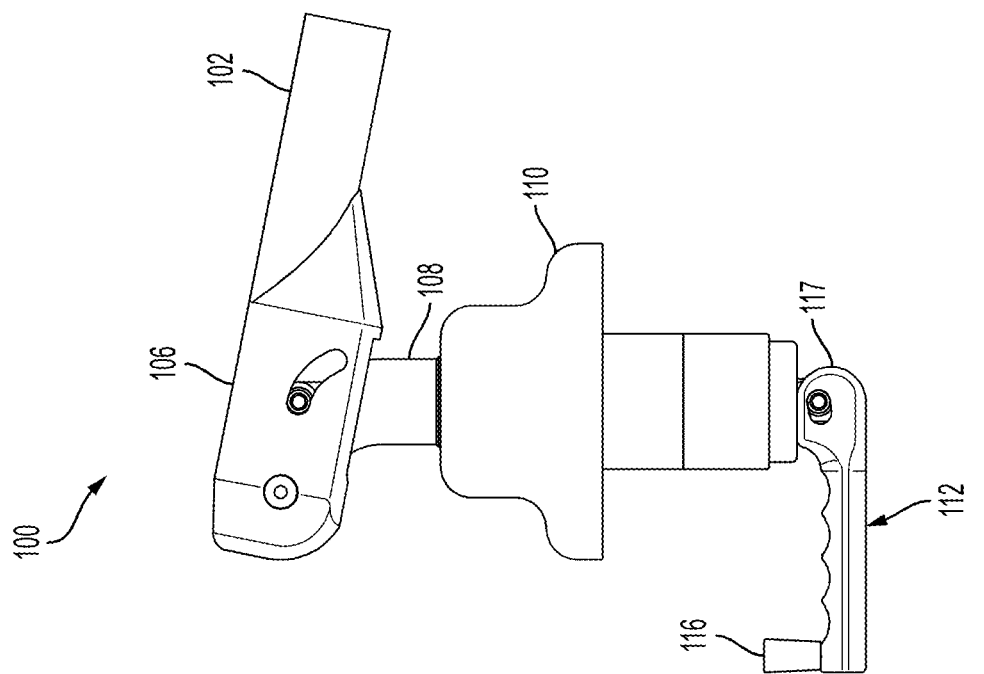
FIG. 3A is a side elevation view of a mount in a first position according to an embodiment of the present invention.
Figure 4:
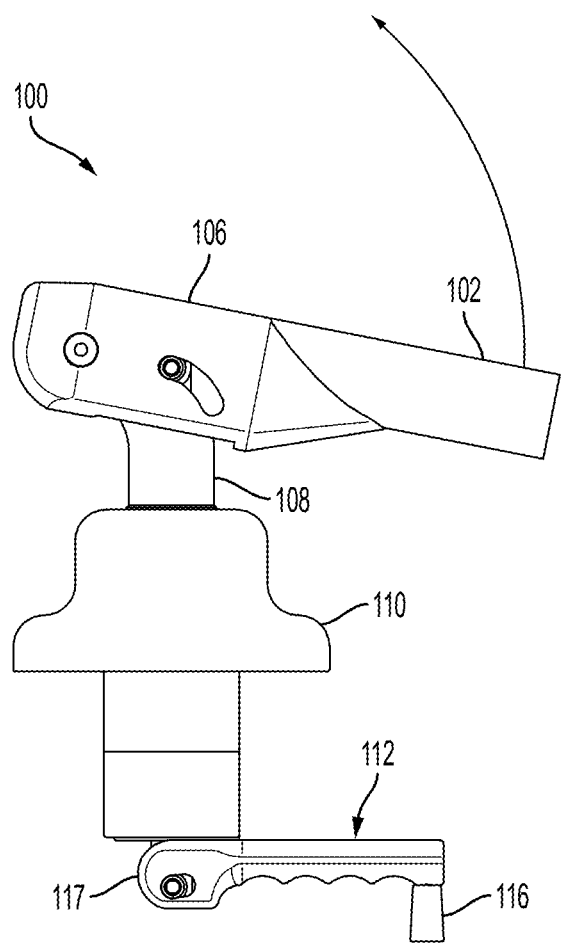
FIG. 4 is a side elevation view of a mount in a second position according to an embodiment of the present invention.
Figure 5:
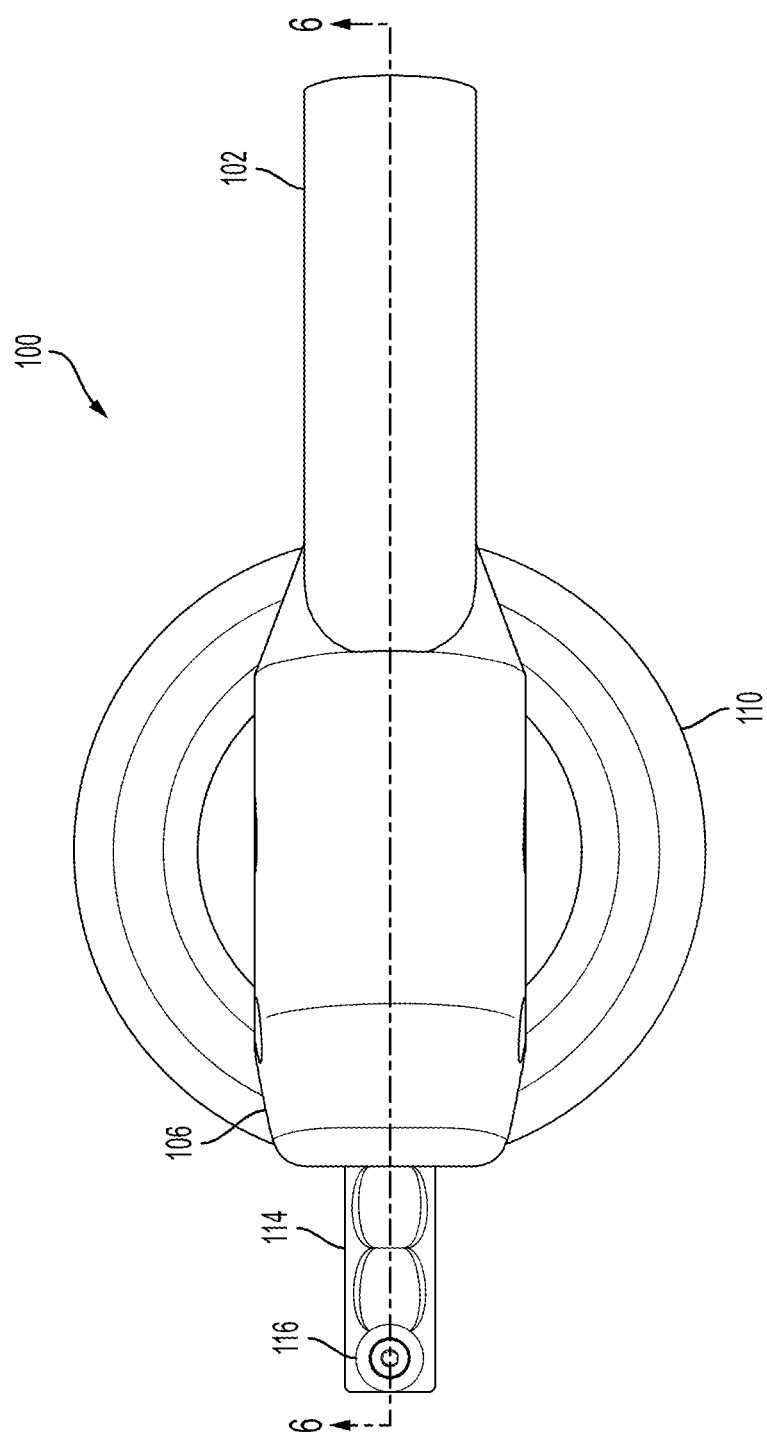
FIG. 5 is a top plan view of a mount according to an embodiment of the present invention.

Referring to FIGS. 1-5, a mount 100 can include a tube 102 having an opening 104 and being coupled to or integral with a base 106. The base 106 can rotate about an axis of an upper housing 108 coupled to an enclosure 110. The enclosure 110 can accordingly be coupled to a lower housing 111. As discussed below in more detail, a handle 112 can be used to rotate the tube 102 in a first rotational direction, for example, about the axis of the upper housing 108, and a second rotational direction perpendicular to the first rotational direction, for example, as shown in FIG. 4.

The handle 112 can include a crank 114 having a knob 116 at a first end and a joint 117 at a second end opposite the first end. The knob 116 can be used to rotate the handle 112 and, accordingly, cause the base 106 and tube 102 to rotate in either horizontal or vertical planes, for example. The joint 117 can allow the handle 112 to be disposed in a first position such that when the knob 116 faces upwardly, as shown in FIGS. 3A and 3B, rotation of the handle 112 causes the tube 102 to rotate in the horizontal plane about an axis of the upper housing 108 and enclosure 110. The handle 112 can thereafter be flipped to a second position such that when the knob 116 faces downwardly, as shown in FIG. 4, rotation of the handle 112 causes the tube 102 to rotate in the vertical plane perpendicular to the horizontal plane. The direction of the knob 116 can alternately be switched, or have no significance at all, to the application of rotation from the handle 112.

As discussed below, in an embodiment, the position of the handle 112 selects a mechanism by which rotation of the handle 112 causes rotation of other components of the mount 100. When the handle 112 is in a first position, for example, as shown in FIGS. 3A and 3B, a first mechanism is selected to cause the tube 102 to rotate in a first rotational direction. When the handle 112 is rotated into a second position, as shown in FIG. 4, a second mechanism is selected to cause the tube 102 to rotate in a second rotational direction perpendicular to the first rotational direction. The handle 112 can also be positionable in more than two positions, and can therefore select more than two mechanisms for rotating the tube 102.

Figure 2:
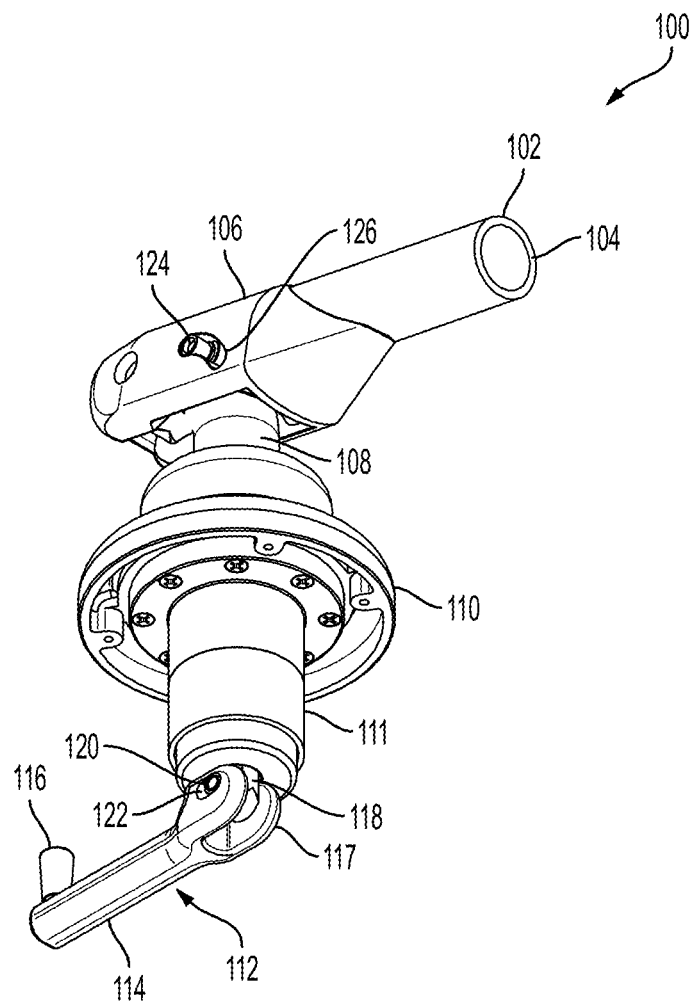
FIG. 2 is a bottom perspective view of a mount according to an embodiment of the present invention.

Referring to FIG. 2, the handle 112 can couple to a handle connector 118 at the joint 117. Specifically, the handle 112 can include a handle pin 120 extending through a pin opening 122 and coupling the joint 117 of the handle 112 to the handle connector 118. In an embodiment, the joint 117 includes a first side, facing the mount 100, and a second side opposite the first side, facing away from the mount 100, when the handle 112 is in the first position, as shown in FIGS. 3A and 3B. The pin opening 122 can be offset with respect to the joint 117, for example, being located closer to the first side or the second side. As shown in FIG. 2, the pin opening 122 can be located closer to the first side facing the remainder of the mount 100 when the handle 112 is in the first position allowing the tube 102 to rotate in a first rotational direction about a horizontal plane. When the handle 112 is flipped, as shown in FIG. 4, the joint 117 pushes upwardly against the mount 100 due to the offset nature of the handle pin 120, and thereby selects a different mechanism to cause the tube 102 to rotate in a second rotational direction, about a vertical plane, perpendicular to the horizontal plane.

Figure 6:
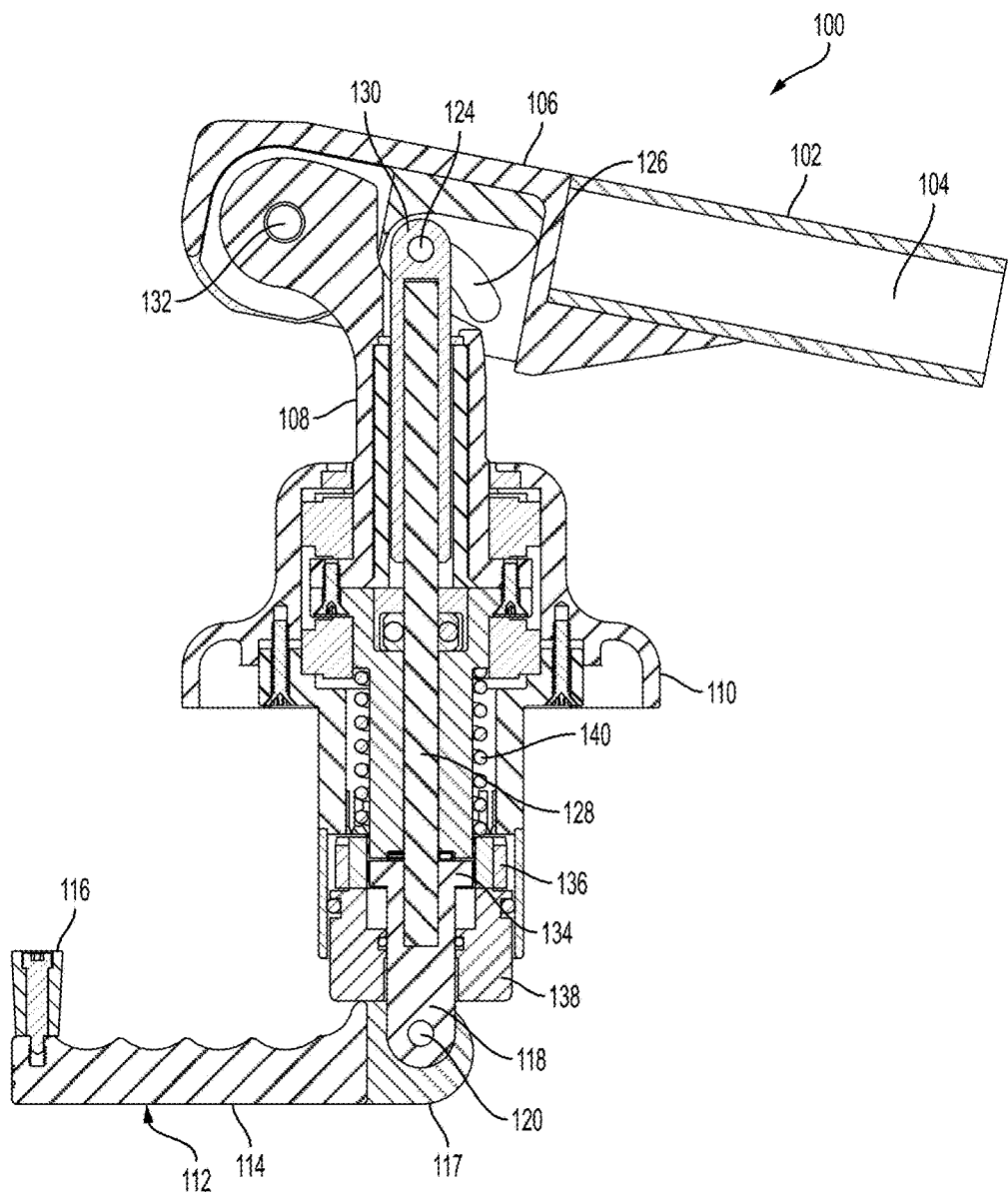
FIG. 6 is a side cross-sectional view of the mount of FIG. 5, as taken along line 5-5 in FIG. 5, according to an embodiment of the present invention.

Referring to FIG. 6, the mount 100 includes a base pin 124 disposed within a slot 126 in the base 106. When the handle 112 is rotated to the second position, as shown in FIG. 4, the tube 102 can rotate based on the force applied to the base 106 by the base pin 124 within the slot 126. In particular, the handle 112 can rotate while in the second position, causing a threaded shaft 128 to rotate and axially displace a base connector 130 coupled to the base pin 124. In particular, the base connector 130 can include internal threads such that, when the threaded shaft 128 rotates, it does so within the internal threads of the base connector 130 and axially moves the base connector 130 within the axis of the threaded shaft 128 while the threaded shaft 128 does not substantially move in the axial direction. In doing so, the base connector 130 and base pin 124 move within the slot 126 and push the tube 102 upwardly, to rotate the tube 102 upwardly, or allow the tube 102 to rotate downwardly under the force of gravity.

Figure 7:
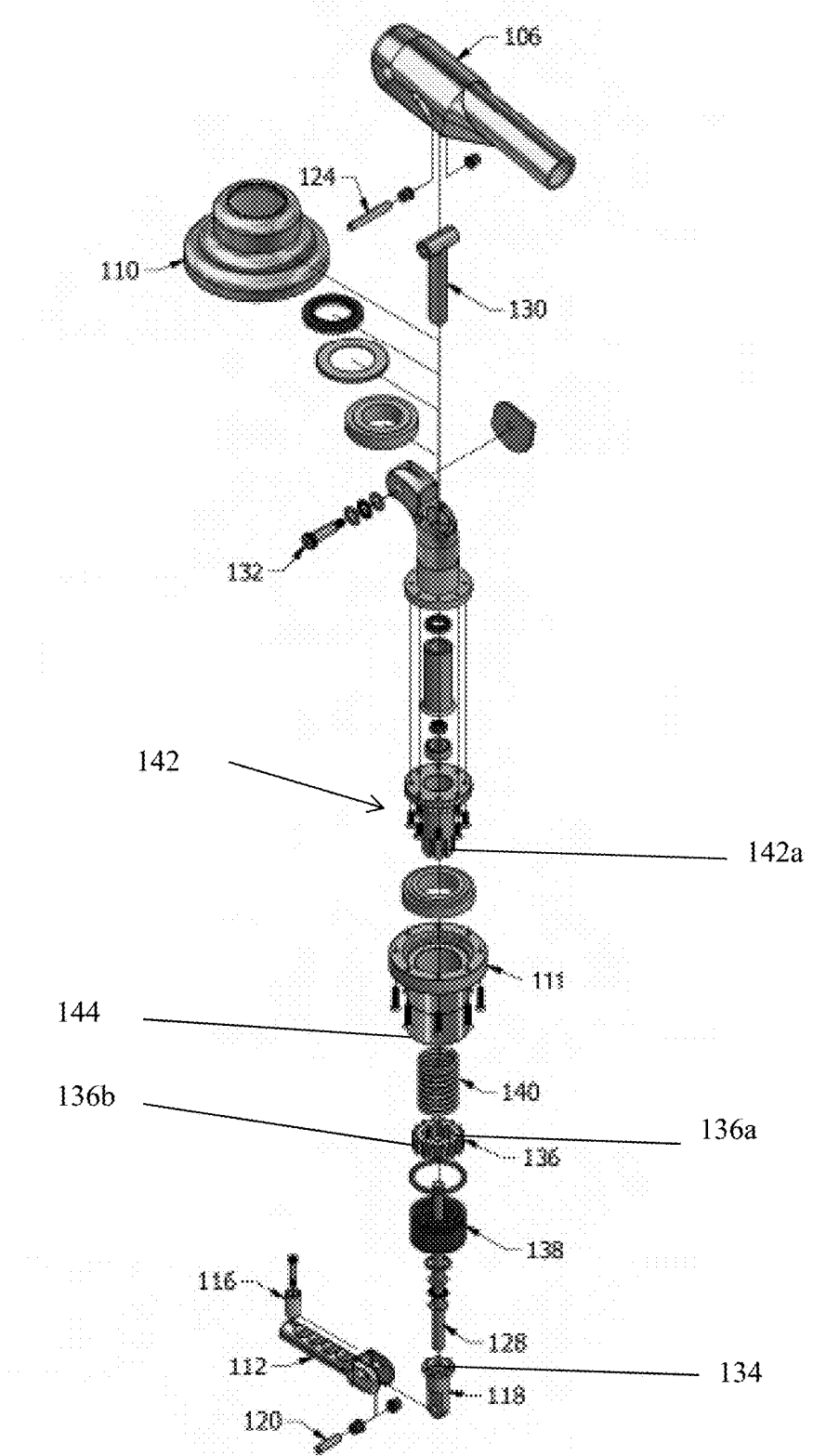
FIG. 7 is an exploded view of a mount according to an embodiment of the present invention.

If the user wishes to rotate the tube 102 within a horizontal plane, as shown in FIGS. 3A and 3B, the user can flip the handle to the position shown in FIGS. 3A and 3B, for example, with the knob 116 facing upwardly. As shown in FIGS. 6 and 7, in this position, a combination of a handle gear 134, selector gear 136, upper housing 108, cap 138, elastic member 140, housing gear 142, and lower housing gears 144 allow the handle 112 to rotate the tube 102 about a horizontal plane.

In the first position, where the tube 102 is rotated in the horizontal position, the handle 112 is rotated such that the cap 138 is pushed outwardly due to the offset nature of the joint 117. In this configuration, as shown in FIGS. 6 and 7, the elastic member 140 pushes the cap 138 outwardly, thereby aligning the internal teeth 136a of the selector gear 136 with the handle gear 134 and the external teeth 142a of the housing gear 142. The external teeth 136b of the selector gear 136 can also be disengaged from the internal teeth 144 of the lower housing 111. Rotation of the handle 112 in this configuration therefore rotates the housing gear 142, which is coupled to the upper housing 108 and the tube 102.

Flipping the handle 112 about the axis of the handle pin 120 disengages the handle gear 134 from the selector gear 136 and engages the selector gear 136 with the internal teeth 144 of the lower housing 111. For example, the cap 138 can be pushed upward by the joint 117 based on the offset nature of the joint 117. For example, the external teeth 136b of the selector gear 136 can be engaged with the internal gears 144 of the upper housing 111. Further, the internal teeth 136a of the selector gear 136 can be engaged with the external teeth 142a of the housing gear 142. However, because the handle gear 134 is disengaged from the selector gear 136, housing gear 142, and internal teeth 142 of the lower housing 111, rotation of the handle 112 will not rotate the upper housing 108. Rather, in this configuration, the threaded shaft 128 can rotate independent of the upper housing 108 within the base connector 130. The threaded shaft 128 can have external threads that are engaged with internal threads of the base connector 130 such that rotation of the threaded shaft 128 causes the base connector 130 to move upward, within the slot 126. Rotation within the base connector 130 thereby causes the tube 102 to rotate in the vertical plane, as discussed above.

As discussed above, the mount 100 can be utilized with tube 102 that may hold an outrigger for use in fishing or boating applications. However, the mount 100 can be utilized with any type of object (referred to broadly as a "body"), and not necessarily only outrigger tube for holding an outrigger.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A mount comprising:
   a body rotatable about a pivot pin;
   a handle having a joint with first and second sides, and a pin opening defined within the joint proximate the first side and distal to the second side, the handle being coupled to the body and adapted to selectively cause the body to rotate in a first rotational direction and a second rotational direction perpendicular to the first rotational direction, depending on a position of the handle;
   a first mechanism coupled to the body and adapted to cause the body to rotate in the first rotational direction when the handle is disposed in a first position
   a second mechanism coupled to the body and adapted to cause the body to rotate in the second rotational direction when the handle is disposed in a second position, wherein the first and second mechanisms are selectable by the handle; and
   a cap disposed proximate the first side when the first mechanism is selected, and disposed proximate the second side when the second mechanism is selected.

2. The mount of claim 1, wherein the second mechanism includes:
   a base pin movably disposed within a slot of the body;
   a base connector coupled to the base pin and having internal threads; and
   a shaft having external threads and threadably coupled to the base connector, the shaft further being coupled to the handle,
   wherein the handle causes the shaft to rotate and axially displace the base connector to move the base pin within the slot.

3. The mount of claim 2, wherein movement of the base pin within the slot causes the body to rotate in the second rotational direction.

4. The mount of claim 1, further comprising a handle connector having a handle gear coupled to the shaft and coupled to the handle at the pin opening.

5. The mount of claim 1, wherein the first mechanism includes:
   a housing gear coupled to the body;
   a selector gear engageable with the housing gear and coupleable to the handle in the first position;
   a shaft coupled to the handle and rotatable based on rotation of the handle;
   a cap disposed proximate the first side when the first mechanism is selected; and
   a bias member biasing the selector gear and cap towards the handle.

6. The mount of claim 5, further comprising a handle gear disposed on the handle, wherein the selector gear includes internal teeth and external teeth, the internal teeth engaging with the handle gear in the first position.

7. The mount of claim 6, wherein the selector gear is coupled with the housing gear and the handle gear when the first mechanism is selected, and the handle gear is disposed within the cap when the second mechanism is selected.

8. The mount of claim 5, wherein movement of the handle gear engaged with the housing gear causes the body to rotate in the first rotational direction.

9. A mount comprising:
   a body rotatable about a pivot pin;
   a handle having a joint with first and second sides, and a pin opening defined within the joint proximate the first side and distal to the second side, the handle being coupled to the body and adapted to cause the body to rotate in a first rotational direction and a second rotational direction perpendicular to the first rotational direction depending on a position of the handle;
   a base pin movably disposed within a slot of the body
   a base connector coupled to the base pin and having internal threads; and
   a shaft having external threads threadably coupled to the base connector, the shaft further being coupled to the handle,
   wherein rotation of the handle causes the shaft to rotate and axially displace the base connector and thereby move the base pin within the slot.

10. The mount of claim 9, further comprising
    an upper housing coupled to the body;
    a selector gear coupled to the upper housing;
    a handle gear coupled to the handle and engageable with the selector gear;
    a cap disposed proximate the first side when the first rotational direction is selected; and
    a bias member biasing the selector gear and into alignment with the handle gear.

11. The mount of claim 10, wherein the handle is rotatable between first and second positions, the first side is located proximate the cap in the first position and distal from the cap in the second position.

12. The mount of claim 9, wherein movement of the base pin within the slot causes the body to rotate in the second rotational direction.

13. The mount of claim 10, wherein movement of the selector gear engaged with the housing gear causes the body to rotate in the first rotational direction.

14. The mount of claim 10, wherein the selector gear is coupled with the housing gear and the handle gear when the first mechanism is selected, and the handle gear is disposed within the cap when the second mechanism is selected.

15. A mount comprising:

a body rotatable about a pivot pin;

a handle having a joint with first and second sides, and a pin opening defined within the joint proximate the first side and distal to the second side, the handle is coupled to a tube and adapted to cause the tube to rotate in a first rotational direction and a second rotational direction perpendicular to the first rotational direction, depending on a position of the handle;

a housing gear coupled to the tube;

a shaft coupled to the handle and adapted to rotate upon rotation of the handle;

a selector gear engageable with the housing gear and coupleable to the handle when the first rotational direction is selected;

a cap disposed proximate the first side when the first rotational direction is selected; and a bias member biasing the selector gear into a coupling engagement with the handle when the first rotational direction is selected.

16. The mount of claim 15, wherein the handle is rotatable between first and second positions, the first side being located proximate the cap in the first position and distal from the cap in the second position.

17. The mount of claim 15, wherein movement of the selector gear engaged with the housing gear causes the body to rotate in the first rotational direction.

18. The mount of claim 16, wherein the handle gear is disposed outside of the cap in the first position, and the handle gear is disposed within the cap in the second position.

19. A mount comprising:

a body rotatable about a pivot pin;

a handle having a joint with first and second sides, and a pin opening defined within the joint proximate the first side and distal to the second side, the handle being coupled to the body and adapted to selectively cause the body to rotate in a first rotational direction and a second rotational direction perpendicular to the first rotational direction, depending on a position of the handle;

a first mechanism coupled to the body and adapted to cause the body to rotate in the first rotational direction when the handle is disposed in a first position; and a second mechanism coupled to the body and adapted to cause the body to rotate in the second rotational direction when the handle is disposed in a second position, the second mechanism includes:

a base pin movably disposed within a slot of the body;

a base connector coupled to the base pin and having internal threads; and a shaft having external threads and threadably coupled to the base connector, the shaft further being coupled to the handle, wherein the handle causes the shaft to rotate and axially displace the base connector to move the base pin within the slot.

20. The mount of claim 19, wherein movement of the base pin within the slot causes the body to rotate in the second rotational direction.

21. The mount of claim 19, further comprising a handle connector having a handle gear coupled to the shaft and coupled to the handle at the pin opening.

* * * * *